No. 886,626. PATENTED MAY 5, 1908.
D. W. McNEEL.
CHURN.
APPLICATION FILED SEPT. 16, 1907.
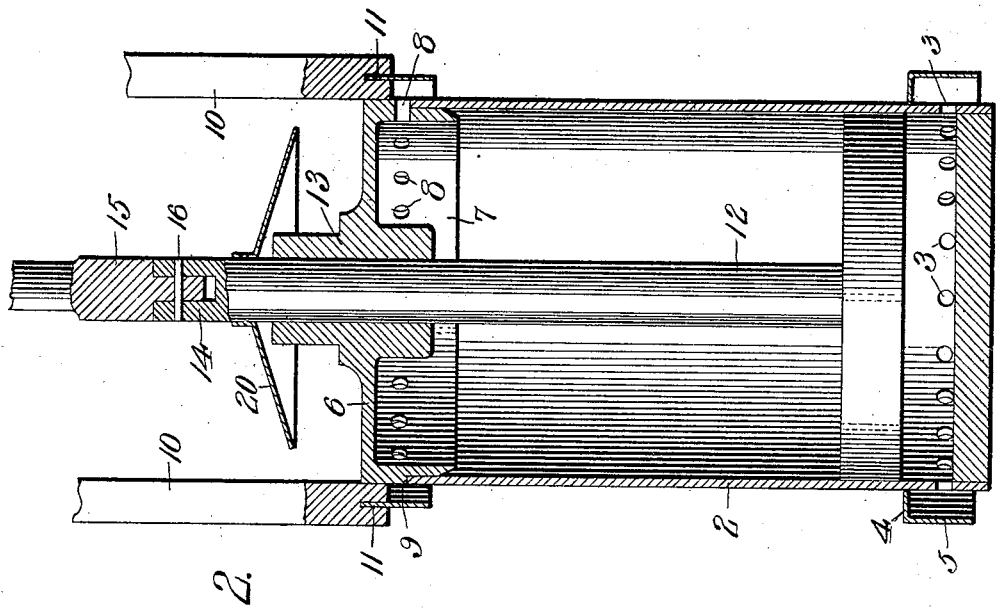
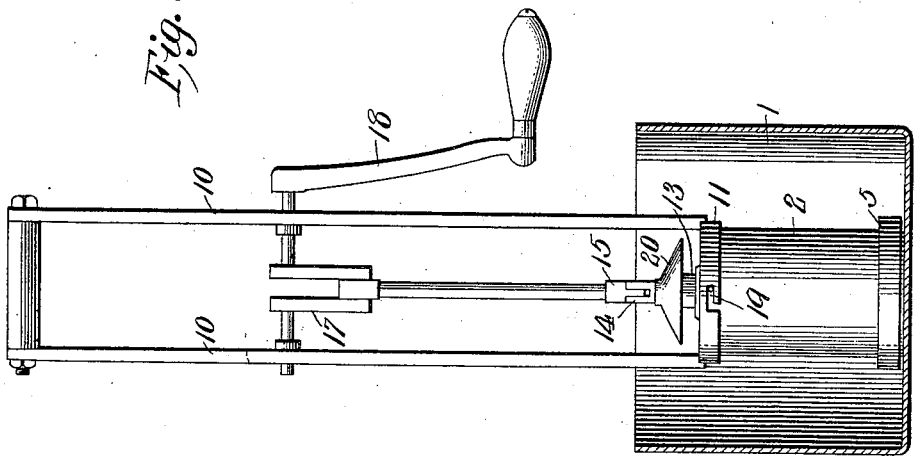
Witnesses.
Jos. F. Collins
J. M. Clynkoop
Inventor:
Daniel W. McNeel.
Knight Bros
Attorneys.

UNITED STATES PATENT OFFICE.

DANIEL W. McNEEL, OF CHARLESTON, ILLINOIS.

CHURN.

No. 886,626.  Specification of Letters Patent.  Patented May 5, 1908.

Application filed September 16, 1907. Serial No. 393,091.

*To all whom it may concern:*

Be it known that I, DANIEL W. MCNEEL, a citizen of the United States, residing at Charleston, in the county of Coles and State of Illinois, have invented certain new and useful Improvements in Churns, of which the following is a specification.

In the drawing, Figure 1 is a front elevation of my improved churn, parts being in section; Fig. 2 is an enlarged detail vertical section through the churn proper.

1 represents a suitable receptacle adapted to hold milk.

2 is a cylinder constructed of any suitable material, preferably aluminum, at the bottom of which are a series of radiating ports 3 extending through the wall of said cylinder.

4 is an annular flange secured to the cylinder above the ports 3, from which depends an annular flange 5, said annular flange extending below the ports 3. The cylinder is provided with a cap 6 having a depending annular flange 7, provided with a series of ports 8 positioned above the shoulder 9. The shoulder 9 rests upon the top edge of the cylinder 2. Secured to the cap 6 are two standards 10.

11 is an annular flange depending from the lower ends of the standards 10 and surrounding the cap 6. This flange extends below the ports or openings 8 in the cap.

12 is the churn dash adapted to slide through the journaled bearing 13 formed in the cap 6. The upper end of the stem of the churn dash is forked as at 14, to which is pivoted a pitman 15 by means of the pin 16.

17 is a crank journaled in the standards 10 to which is journaled the upper end of the pitman 15.

18 is a hand operated crank secured to the shaft of the crank 17.

The cap 6 carrying the standards 10 is secured to the cylinder 2 by means of the bayonet joint 19. Any suitable means of securing the cap to the cylinder 2 may be employed.

20 is a supplemental dash secured to the stem 12 outside of and above the cylinder 2.

The operation is as follows, it being assumed that the cylinder 2 is immersed in milk in the receptacle 1: The crank 18 is operated, thereby raising and lowering the dash 12 within the cylinder 2, which results in alternately drawing the milk in one set of ports and forcing it out at the other set of ports in the cylinder. For instance, as the dash is being raised, milk is drawn in through the ports 3 and forced out through the ports 8. The milk on being forced through the ports in the cylinder and in its cap strikes the flanges 5 and 11, which are spaced some short distance from the sides of the cylinder. By throwing the milk against these flanges with great force, the globules of milk or cream are broken up, thus facilitating the separation of the butter. As soon as the butter is separated, it will float to near the top of the milk and the dasher 20 tends to gather the butter together and compact it in one body instead of separate globules.

The stroke of the dash 12 is such that it will not pass between the perforations and the top of the cap 6 and the perforations and the bottom of the cylinder 2. The reason for this is that if the dash were allowed to press against the top or on the bottom of the cylinder as the butter formed, it would compact the butter against the ends of the cylinder and in a short time clog the perforations, and prevent the flow of the milk through them. I find that butter formed outside of the cylinder by striking against the flanges 5 and 11 is constantly washed away from the cylinder by the milk and has a tendency to collect above the cylinder. A further object of the flanges 5 and 11 is to prevent splashing of the milk outside of the receptacle 1.

The receptacle 1 and its associated parts may be rigidly secured to the cylinder 2 by any suitable means.

What I claim is:—

1. In a churn, the combination with a cylinder having ducts leading therefrom at the top and bottom, flanges surrounding the cylinder at the top and bottom, and extending to a point below said ducts, and a dash suitably mounted in said cylinder.

2. In a churn, the combination with a receptacle, of a cylinder positioned therein and provided with ducts leading from the interior of the cylinder at the top and bottom thereof, flanges extending over said ducts, but spaced from the side of the wall, and a dash mounted in said cylinder.

3. In a churn, the combination with a receptacle, of a cylinder positioned therein and provided with ducts in its wall at the lower end thereof, an annular flange surrounding said cylinder, but spaced therefrom and extending below said ducts, a cover for said cylinder having radial ducts, a depending flange secured to said cover and extending below said ducts.

4. In a churn, the combination with a receptacle, of a cylinder positioned therein and provided with ducts in its wall at the lower end thereof, an annular flange surrounding said cylinder, but spaced therefrom and extending below said ducts, a cover for said cylinder having radial ducts, a depending flange secured to said cover and extending below said ducts, a reciprocating dash mounted in said cylinder and extending above the cover, and a supplemental dash mounted upon the first-named dash outside of the cylinder above the cover thereof.

5. In a churn, the combination of a receptacle, of a cylinder removably secured therein and provided with radiating ducts through its wall at the bottom, an annular flange surrounding the lower end of the cylinder but spaced therefrom and depending below the said ducts, a cap for said cylinder having radiating ducts, an annular flange depending from said cap to a point below the said ducts in the cap, a dash reciprocally mounted in said cylinder, a stem secured to said dash and extending through the cap, a supplemental dash secured to said stem above said cap, standards extending from said cap, a crank shaft journaled between said standards, a pitman connecting said crank shaft and the stem of the dash, and a crank arm secured to said crank shaft.

The foregoing specification signed at Charleston, Illinois, this tenth day of August, 1907.

DANIEL W. McNEEL.

In presence of—
GEO. W. ROSEBRAUGH,
NELLE BURKE.